US007446929B1

(12) United States Patent
Jayaraman et al.

(10) Patent No.: US 7,446,929 B1
(45) Date of Patent: Nov. 4, 2008

(54) PHOTONIC DEVICE INCLUDING AT LEAST ONE ELECTROMAGNETIC RESONATOR OPERABLY COUPLED TO A STATE-CHANGE MATERIAL

(75) Inventors: Logeeswaran V. Jayaraman, Davis, CA (US); Bryan L. Jackson, Oakland, CA (US); Zhiyong Li, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 28 days.

(21) Appl. No.: 11/796,085

(22) Filed: Apr. 25, 2007

(51) Int. Cl.
*G02F 1/29* (2006.01)
*G02F 1/03* (2006.01)
(52) U.S. Cl. ...................... 359/299; 359/245
(58) Field of Classification Search ................ 359/241, 359/244–245, 288, 299
See application file for complete search history.

(56) References Cited

U.S. PATENT DOCUMENTS

| 2004/0114847 | A1 | 6/2004 | Fischer et al. |
| 2006/0109541 | A1 | 5/2006 | Osipov et al. |

FOREIGN PATENT DOCUMENTS

WO    WO2007/103560    * 12/2007

OTHER PUBLICATIONS

Simovski, Constantin R., et al., "Frequency range and explicit expressions for negative permittivity and permeability for an isotropic medium formed by a lattice of perfectly Ω particles", Physics Letters A, 2003, pp. 254-263.

Rini, Matteo, et al., "Photoinduced phase transition in VO2 nanocrystals: ultrafast control of surface-plasmon resonance", Optics Letters, Mar. 1, 2005, pp. 558-560, vol. 30.
Padilla, W.J., et al., "Dynamical Electric and Magnetic Metamaterial Response at Terahertz Frequencies", Oct. 27, 2005, pp. 1-4.
Soukoulis, Costas M., et al., "Negative-Index Materials: New Frontiers in Optics**", Advanced Materials, 2006, vol. 18, pp. 1941-1952.
Mittleman, Daniel, "A terahertz modulator", Nature, Nov. 30, 2006, vol. 444, pp. 560-561.
Chen, Hou-Tong, et al., "Active terahertz metamaterial devices", Nature, Nov. 30, 2006, vol. 444, pp. 597-600.
Soukoulis, Costas M., "Negative Refractive Index at Optical Wavelengths", Science, Jan. 5, 2007, vol. 315, pp. 47-1.
Logeeswaran, V.J., et al., "Switching between positive and negative permeability by photoconductive coupling for modulation of electromagnetic radiation", Applied Physics A, Mar. 3, 2007, pp. 209-216.

* cited by examiner

*Primary Examiner*—Scott J. Sugarman
*Assistant Examiner*—Dawayne A Pinkney

(57) ABSTRACT

Various aspects of the present invention are directed to photonic devices configured to control transmission of electromagnetic radiation through a resonator structure. In one aspect of the present invention, a photonic device includes at least one electromagnetic resonator and a state-change material operably coupled to the at least one electromagnetic resonator. The state-change material is capable of being reversibly transitioned between a high-resistivity state and a low-resistivity state, with a ratio of the resistivity of the high-resistivity state to the resistivity of the low-resistivity state being at least about 100. Transmission of electromagnetic radiation through the at least one electromagnetic resonator at an operational frequency is controllable by transitioning the state-change material between the high-resistivity state and the low-resistivity state. Methods for controlling transmission of a signal are also disclosed.

20 Claims, 11 Drawing Sheets

PHOTONIC DEVICE INCLUDING AT LEAST ONE ELECTROMAGNETIC RESONATOR OPERABLY COUPLED TO A STATE-CHANGE MATERIAL

TECHNICAL FIELD

Embodiments of the present invention generally relate to a photonic device configured to control transmission of electromagnetic radiation through a resonator structure.

BACKGROUND

The ability to control propagation of electromagnetic radiation is important in many different technology areas, such as optical fiber systems and electronic devices. Devices for controlling propagation of electromagnetic radiation can form important components in many electronic and optical devices. For example, modulators are used in optical fiber systems for modulating an intensity of a carrier signal in order to generate an encoded signal. Modulators can also form important components in photonic integrated circuits ("PICs") that include electronic devices and optoelectronic devices. PICs are the photonic equivalent of electronic integrated circuits and may be implemented on a semiconductor substrate that forms the base of the electronic and optoelectronic devices. As one example, a modulator can be used to modulate an optical signal that is communicated between different electronic devices or different functional circuitry on the same substrate.

Metamaterials appear to be a promising candidate for use as switches, modulators, and filters in electronic and optical devices. Metamaterials are materials that are engineered to have electromagnetic responses that can be impossible in naturally occurring materials, such as a negative refractive index. The refractive index of a material, n, is a measure of the speed of light in the material, and is given by $n=\sqrt{\mu \cdot \in}$, where $\mu$ is the material's permeability to magnetic fields, and $\in$ is the materials permittivity to electric fields. Most naturally occurring materials have positive $\mu$ and positive $\in$. The refractive index is a real and positive number in such naturally occurring materials.

Assembling a collection of appropriately designed metallic structures enables fabricating a metamaterial that has a negative $\mu$ and/or a negative $\in$ for incident electromagnetic radiation of a particular frequency. For example, an array of split-ring resonators ("SRRs") is one type of electromagnetic resonator structure that has a negative $\mu$ and a cut-wire structure is a structure that has a negative $\in$. A one-, two-, or three-dimensional arrangement of SRRs and cut-wires's may form an effective medium that exhibits a negative refractive index. Additionally, transmission through an array of SRRs or a cut-wire structure is substantially reduced at frequencies at and near a characteristic resonant frequency. Moreover, the transmission characteristics of a metamaterial can be designed by changing the size and configuration of the individual SRRs and wires. Accordingly, metamaterials may be designed for use with incident electromagnetic radiation over a wide range of frequencies.

Metamaterial's unique transmission characteristics makes them suitable for use in many types of optical and electronic devices as switches, modulators, or other components. However, there is still a need for improved metamaterial-based devices for use in many different types of electronic and optical devices.

SUMMARY

Various aspects of the present invention are directed to photonic devices configured to control transmission of electromagnetic radiation through a resonator structure. In one aspect of the present invention, a photonic device includes at least one electromagnetic resonator and a state-change material operably coupled to the at least one electromagnetic resonator. The state-change material is capable of being reversibly transitioned between a high-resistivity state and a low-resistivity state, with a ratio of the resistivity of the high-resistivity state to the resistivity of the low-resistivity state being at least about 100. Transmission of electromagnetic radiation through the at least one electromagnetic resonator at an operational frequency is controllable by transitioning the state-change material between the high-resistivity state and the low-resistivity state.

In another aspect of the present invention, a method of controlling transmission of a signal is disclosed. At least one electromagnetic resonator with a state-change material operably coupled to the at least one electromagnetic resonator is provided. The at least one electromagnetic resonator is irradiated with the signal. The state-change material is transitioned between a high-resistivity state and a low-resistivity state to control transmission of the signal through the at least one electromagnetic resonator.

BRIEF DESCRIPTION OF THE DRAWINGS

The drawings illustrate various embodiments of the present invention, wherein like reference numerals refer to like or similar elements in different views or embodiments shown in the drawings.

DETAILED DESCRIPTION OF VARIOUS EMBODIMENTS

Various embodiments of the present invention are directed to photonic devices configured to control transmission of electromagnetic radiation through a resonator structure. The disclosed embodiments of photonic devices may be employed in applications, such as optical fiber systems, PICs, and many other applications.

Figure 1:
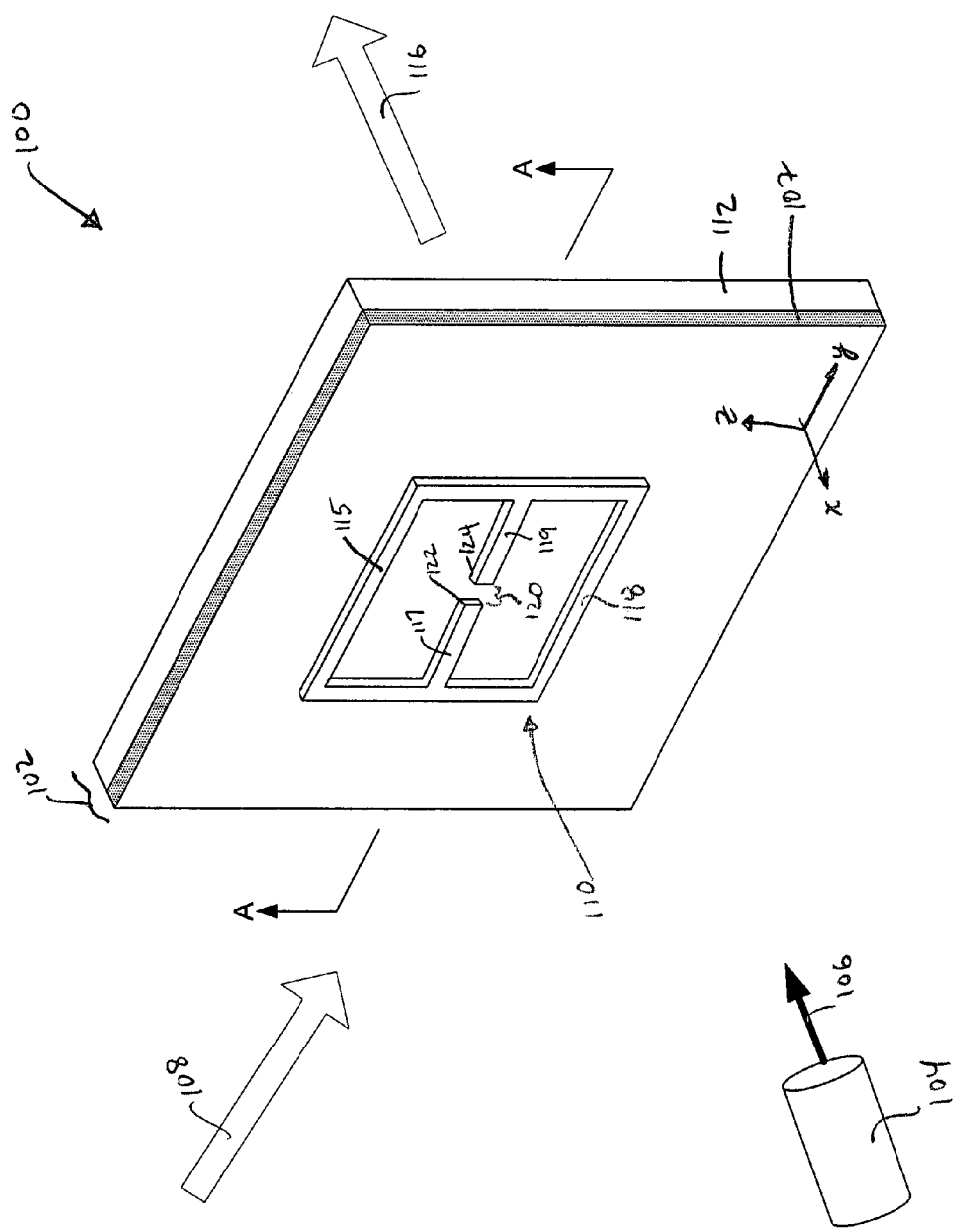
FIG. 1 is a schematic isometric view of a photonic device including a resonator structure having at least one electromagnetic resonator according to one embodiment of the present invention.
Figure 2:
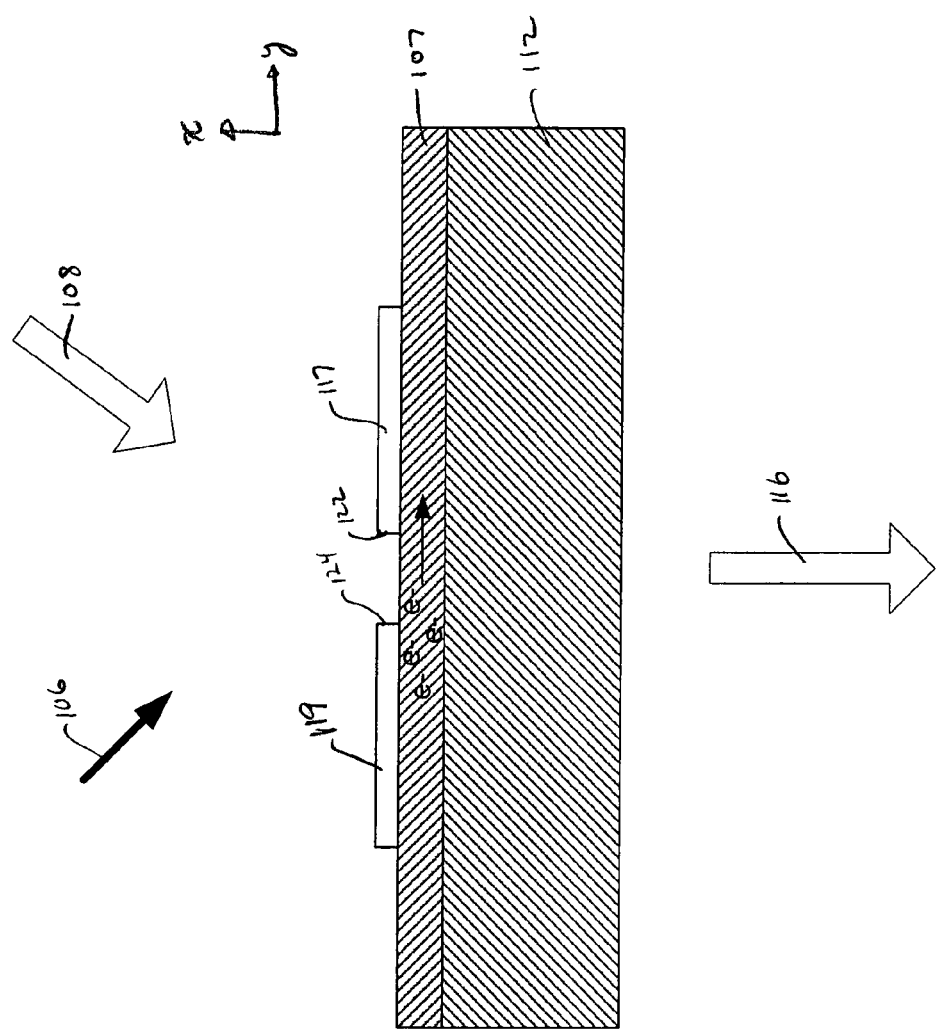
FIG. 2 is a schematic cross-sectional view of the resonator structure shown in FIG. 1 taken along line A-A.

FIGS. 1 and 2 show a photonic device 100 according to one embodiment of the present invention. The photonic device 100 includes a resonator structure 102 and a control radiation source 104 configured to output an electromagnetic control signal 106 that causes a layer 107 of the resonator structure 102 to transition between a high-resistivity state and a low-resistivity state. The control radiation source 104 may be a laser diode, a light-emitting diode ("LED") in conjunction with one or more lenses, or another suitable high-intensity electromagnetic radiation source. Transmission of an electromagnetic signal 108 at a selected frequency through the resonator structure 102 may be controlled by controlling the resistivity state of a state-change material comprising the layer 107.

The state-change material is a material that is capable of reversibly transitioning between a high-resistivity state and a low-resistivity state. As will be discussed in more detail below with respect to FIGS. 4 and 5, transmission of the signal 108 through the electromagnetic resonator 110 may be controlled by selectively transitioning the state-change material of the layer 107 responsive to irradiation with the control signal 106. For example, the intensity of the signal 108 may be modulated to produce a modulated signal 116 or propagation of the signal 108 through the resonator structure 102 may be substantially blocked. The high-resistivity state is a state of the state-change material in which the resistivity is within the range for a dielectric material, such as a metal oxide. A representative resistivity range for the state-change material in the high-resistivity state is about 1 ohm·cm to about $10^{14}$ ohm·cm. The low-resistivity state is a state of the state-change material in which the resistivity is within the range for a metallic material, such as substantially pure metal or an alloy. A representative resistivity range for the state-change material in the low-resistivity state is about $10^{-5}$ ohm·cm to about 1 ohm·cm. A ratio of the resistivity of the high-resistivity state to the resistivity of the low-resistivity state in the state-change materials disclosed herein may be at least about 100, more specifically at least about $10^3$, and even more specifically at least about $10^5$. A representative range for the ratio of the resistivity of the high-resistivity state to the resistivity of the low-resistivity state in the state-change materials disclosed herein is about 100 to about $10^6$.

With continued reference to FIGS. 1 and 2, the resonator structure 102 includes at least one electromagnetic resonator 110 made from an electrically conductive material (e.g., a metallic material or a degenerately-doped semiconductor material) and a suitable substrate 112, with the layer of state-change material 107 disposed between the electromagnetic resonator 110 and the substrate 112. As used herein, the phrase "electromagnetic resonator" refers to a resonator that exhibits one or more resonance modes excitable by an electric field, a magnetic field, or both from incident electromagnetic radiation having a wavelength about five-times or more than the largest dimension of the resonator. The substrate 112 may be formed of any suitable material on which the layer 107 can be formed and that is at least partially transmissive to the signal 108. For example, the substrate 112 may be a single-crystal silicon substrate, a glass substrate, or another type of suitable substrate. The layer 107 may be formed on the substrate 112 using physical vapor deposition ("PVD"), chemical vapor deposition ("CVD"), atomic layer deposition ("ALD"), an electrochemical deposition technique, or another suitable deposition process. Electromagnetic resonators, such as the electromagnetic resonator 110 may exhibit a negative permeability to magnetic fields, $\mu$, and/or negative permitivitty to electric fields, $\in$. The electromagnetic resonator 110 may also be formed on the layer 107 using many well-known micro- and nano-fabrication techniques to precisely control the dimensions and geometry thereof, such as photolithography and nanoimprint lithography.

Figure 3A:
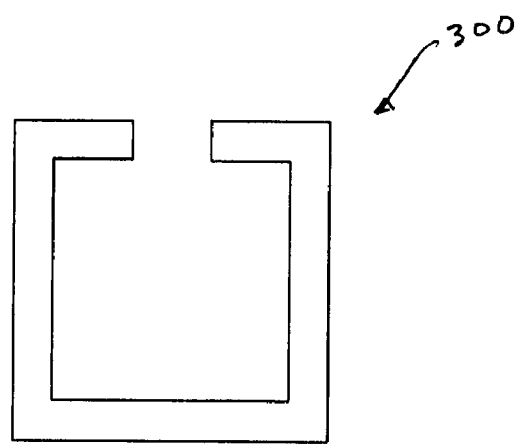
FIGS. 3A and 3B are schematic plan views of resonator structures according to various embodiments of the present invention.
Figure 3B:
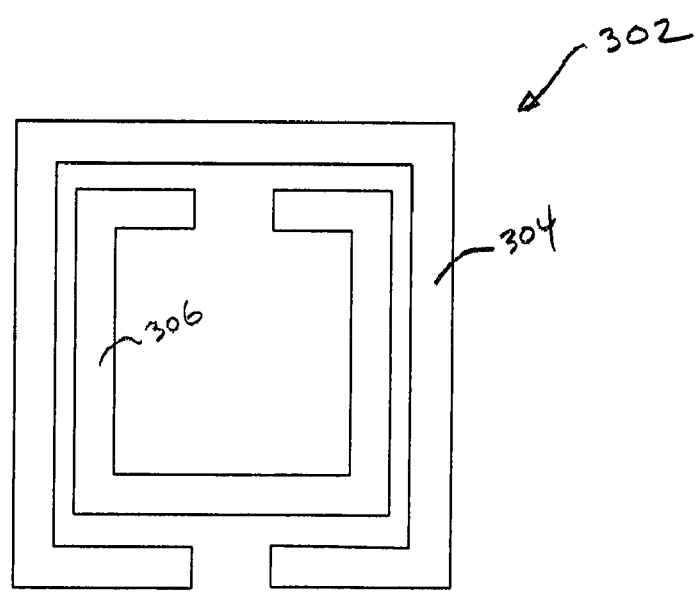

FIGS. 1 and 2 show one specific embodiment for the configuration of the electromagnetic resonator 110. The electromagnetic resonator 110 has subwavelength dimensions in which the largest dimension may be, for example, about one-tenth to about one-twentieth the wavelength of the signal 108. The electromagnetic resonator 110 includes two split-ring portions 115 and 118 forming electrode 117 having a first end 122 and electrode 119 having a second end 124. The first end 122 and second end 124 are spaced to define a gap 120. It is noted, however, that other configurations for the electromagnetic resonator 110 may be used besides the particular configuration shown in FIGS. 1 and 2. For example, FIGS. 3A and 3B show, respectively, two other embodiments for a split-ring resonator 300 and a split-ring resonator 302. For example, the split-ring resonator 300 has a single split-ring body, while the split-ring resonator 302 has an inner split-ring body 304 and an outer split-ring body 306 extending about the inner split-ring body 304. In another embodiment of the present invention, the electromagnetic resonator 110 may be replaced with a cut-wire structure comprising a number of discrete, spaced electrically conductive wires that may be, for example, embedded within the layer 107. Thus, the electromagnetic resonator 110 configured as a split-ring resonator is merely illustrative, and other types of electromagnetic resonators may be employed in conjunction with the state-change materials disclosed herein.

Figure 4:
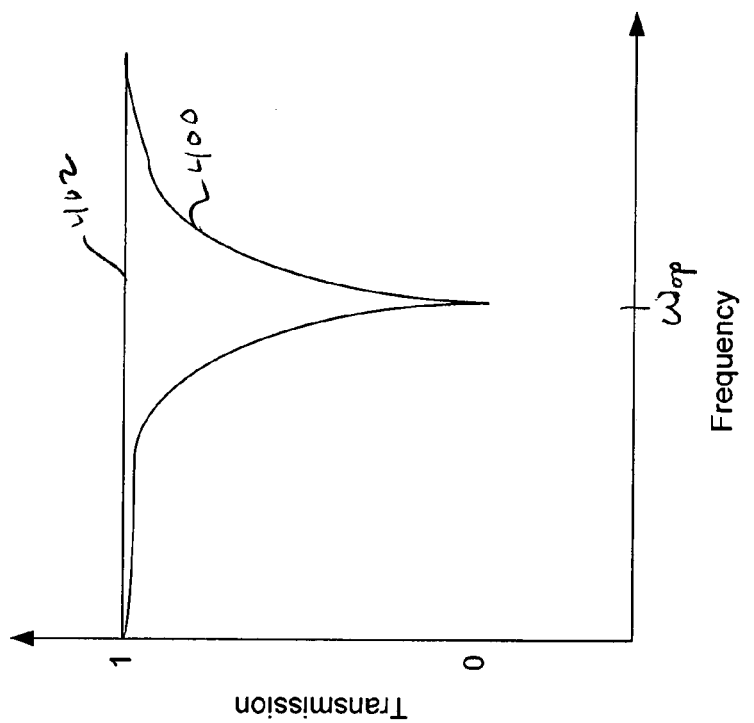
FIG. 4 is a graph of the transmission spectrum through the resonator structure shown in FIGS. 1 and 2.

The response of the electromagnetic resonator 110 to irradiation by electromagnetic radiation is most clearly understood with reference to FIG. 4 in conjunction with FIG. 1. FIG. 4 shows transmission spectrums 400 and 402 for the electromagnetic resonator 110 for two different operational conditions. The transmission spectrum 400 is the transmission spectrum through the electromagnetic resonator 110 when there is not a substantial electrical pathway across the gap 120 (i.e., the state-change material is in the high-resistivity state). The transmission spectrum 402 is the transmission spectrum through the electromagnetic resonator 110 when the gap 120 is short circuited (i.e., the state-change material is in the low-resistivity state). As shown by the transmission spectrum 400, when there is not a substantial conductive pathway across the gap 120, transmission of electromagnetic radiation through the electromagnetic resonator 110 is highly dependent on the frequency of the electromagnetic radiation. When the frequency of the electromagnetic radiation is at or near an operational frequency $\omega_{op}$, transmission through the electromagnetic resonator 110 is substantially reduced and may be approximately zero. The frequency dependent transmission through the electromagnetic resonator 110 represented by the transmission spectrum 400 is due to the presence of the gap 120, which prevents current from circulating across the gap 120 that may be generated responsive to a magnetic or an electric field of the electromagnetic radiation that irradiates the electromagnetic resonator 110. Instead, the electrons oscillate back and forth between the first end 122 and the second end 124 of the electromagnetic resonator 110, and a capacitance develops across the gap 120, with oscillatory charges accumulating at the first end 122 and the second end 124.

In certain embodiments of the present invention, the operational frequency $\omega_{op}$ is at or near a characteristic magnetic resonance frequency $\omega_m$ that the magnetic field of the incident electromagnetic radiation excites in the electromagnetic resonator 110. In such an embodiment, the electromagnetic resonator 110 exhibits a negative effective permeability for a specific frequency range of interest. In other embodiments of present invention, the operational frequency $\omega_{op}$ is at or near a characteristic electric-dipole resonance frequency $\omega_o$ that the electric field of the incident electromagnetic radiation excites in the electromagnetic resonator 110. In such an embodiment, the electromagnetic resonator 110 exhibits a negative effective permittivity for a specific frequency range of interest.

As discussed above, the magnitude of the operational frequency $\omega_{op}$ may be at or near a resonance frequency $\omega_r$ (e.g., $\omega_m$ or $\omega_o$). The characteristic resonance frequency $\omega_r$ of the electromagnetic resonator 110 may be controlled by the geometry, size, and materials used to form the electromagnetic resonator 110. The electromagnetic resonator 110 is scalable and may be designed so that the resonance frequency $\omega_r$ falls within the terahertz, infrared, near infrared, and visible frequency ranges. Thus, reducing the dimensions of the electromagnetic resonator 110 reduces the wavelength of the resonance of the electromagnetic resonator 110. Additionally, electric field and magnetic field polarization direction of the incident electromagnetic radiation affects which resonance (magnetic or electric-dipole) is excited in the electromagnetic resonator 110. For example, a magnetic resonance at the frequency $\omega_m$ may be excited in the electromagnetic resonator 110 when incident electromagnetic radiation has a wavevector in the y-direction, an electric field polarization in the z-direction, and a magnetic field polarization in the x-direction. In another example, an electric-dipole resonance at the frequency $\omega_o$ may be excited in the electromagnetic resonator 110 when the electric field polarization direction is in the y-direction and the magnetic field polarization may be in or out of the plane of the electromagnetic resonator 110 (i.e., the y-z plane).

The frequency dependence of transmission of electromagnetic radiation through the electromagnetic resonator 110 is substantially eliminated when an electrically conductive pathway is provided across the gap 120 (i.e., the state-change material is in the low-resistivity state). The transmission spectrum 402 shown in FIG. 4 illustrates transmission through the electromagnetic resonator 110 when the capacitive response of the gap 120 is shorted, with the transmission being relatively constant and frequency independent. This is schematically illustrated in FIG. 2, where electrons are shown to flow from the first end 122 to the second end 124 across the gap 120 through the state-change material of the layer 107. Thus, the transmission spectrum of the electromagnetic resonator 110 may be controlled by selectively transitioning the state-change material of the layer 107 from a low-resistivity state (i.e., shorting the gap 120) in which the electromagnetic resonator 110 exhibits the transmission spectrum 402 and a high-resistivity state in which the electromagnetic resonator 110 exhibits the transmission spectrum 400 with one or more, distinct, minima frequencies.

Figure 5:
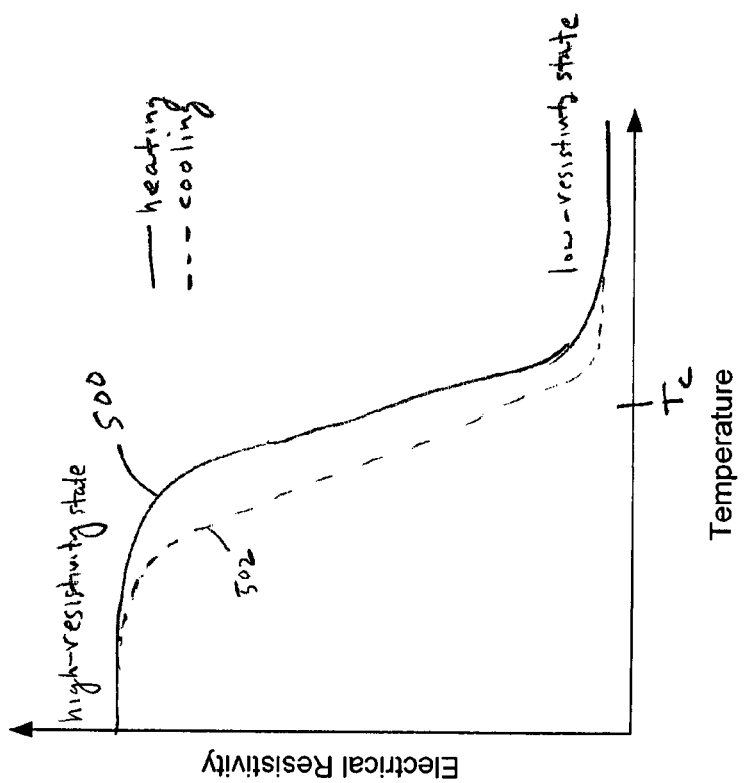
FIG. 5 is a graph illustrating the temperature dependence of electrical resistivity of a state-change material that can be used to control the transmission through the resonator structure shown in FIGS. 1 and 2.

FIG. 5 shows an example of one type of state-change behavior that the state-change material comprising the layer 107 (FIGS. 1 and 2) may exhibit. With reference to curve 500 shown in FIG. 5, heating the state-change material above a critical temperature $T_c$ transitions the state-change material from a high-resistivity state to a low-resistivity state. The state transition is reversible and, as shown in curve 502, cooling the state-transition material below the critical temperature $T_c$ causes the state-change material to transition from the low-resistivity state to the high-resistivity state.

According to various embodiments of the present invention, the layer 107 may be made from a metal oxide. In more specific embodiments of the present invention, the metal oxide is an oxide of vanadium, niobium, tungsten, or titanium. In many of the above-mentioned metal oxides, the transition between the low-resistivity state and the high-resistivity state is associated with a phase change from a first crystal structure to a second crystal structure. For example, $VO_2$ undergoes a phase change at a critical temperature of about 68° C. from an electrically insulating phase having a monoclinic crystal structure (i.e., a high-resistivity phase) to an electrically conductive phase having a rutile crystal structure (i.e., a low-resistivity phase). The critical temperature $T_c$ may be altered by changing the stoichiometry of the vanadium oxide. It is noted that while the reversible transition between the high-resistivity state and the low-resistivity state is currently believed to be due to a temperature-driven phase change, there may be other causes for the state-transition behavior. For example, the state transition may be optically driven, driven by an applied electric field, and/or a change in temperature. Additionally, it is noted that the state-transition behavior shown in FIG. 5 represents merely one type of state-transition behavior that the state-change material may exhibit.

The state-transition behavior shown in curves 500 and 502 of FIG. 5 may be driven by irradiation of the state-change material of the layer 107 (FIGS. 1 and 2) with the control signal 106 (FIGS. 1 and 2) emitted by the control radiation source 104, which may heat the layer 107 past the critical temperature $T_c$ to cause the state-change material of the layer 107 to transition from the high-resistivity state to the low-resistivity state. In certain embodiments of the present invention, the frequency of the control signal 106 is selected to maximize absorption by the state-change material of the layer 107 to ensure rapid and efficient heating. For example, the transition from the high-resistivity state to the low-resistivity state may be effected in a femtosecond time scale in $VO_2$, such as about 500 fs. $VO_2$ is also transmissive to electromagnetic radiation at wavelengths between about 1.3 µm and about 1.55 µm, which are the typical wavelengths used in telecommunication applications. Moreover, when the control signal 106 has an intensity that is reduced to a sufficiently low optical intensity, the state-change material of the layer 107 transitions back to the high-resistivity state. Thus, the state-change material of the layer 107 may be selectively, reversibly, changed between a high-resistivity state and a low-resistivity state by irradiation of the layer 107 with the control signal 106 that, in-turn, causes the transmission spectrum of the electromagnetic resonator 110 to transition between the transmission spectrums 400 and 402.

Figure 6A:
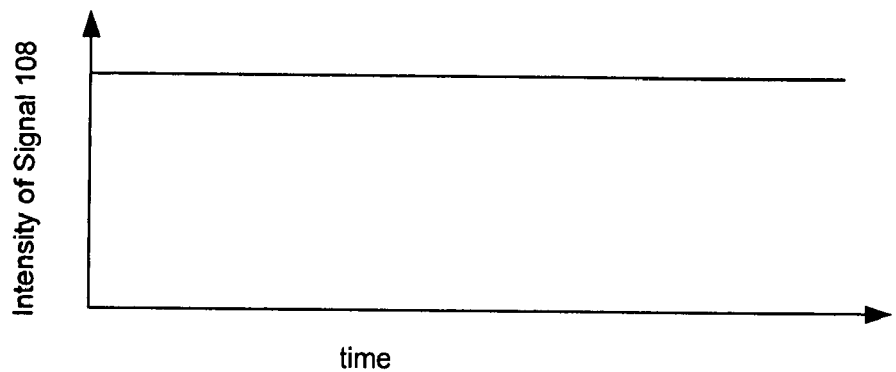
FIG. 6A is a graph of the intensity of the signal at the operational frequency shown in FIGS. 1 and 2.
Figure 6B:
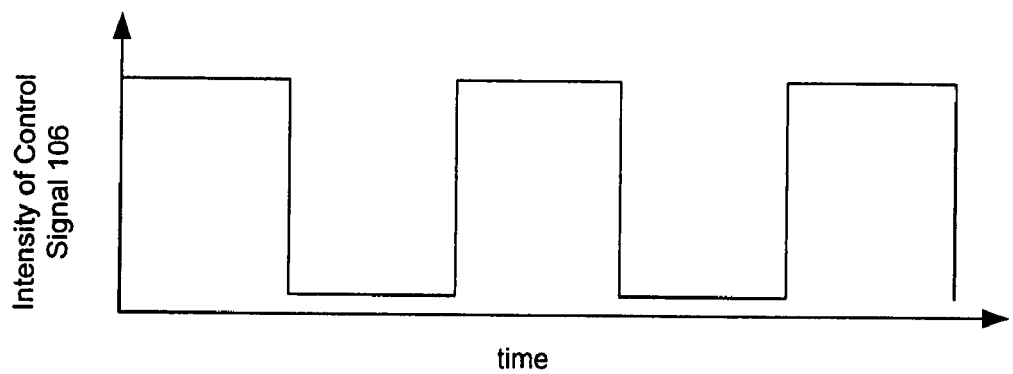
FIG. 6B is a graph of the time-varying intensity of the control signal shown in FIGS. 1 and 2.
Figure 6C:
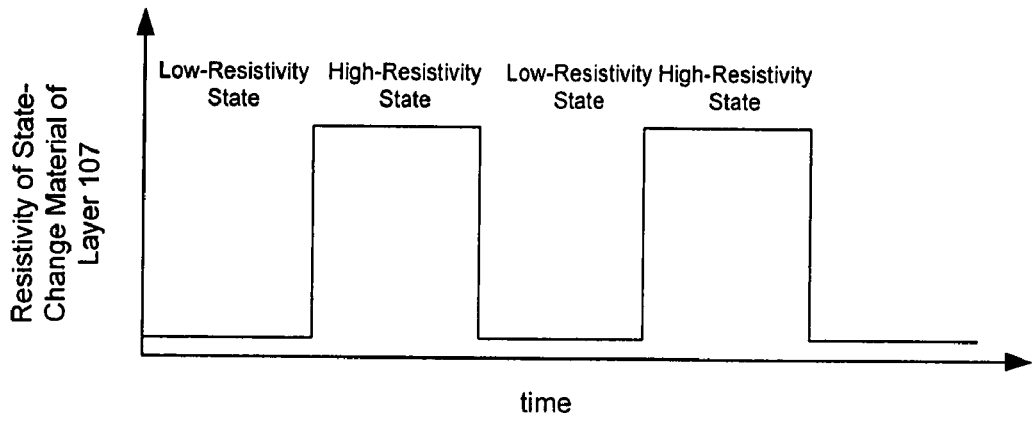
FIG. 6C is a graph of the time-varying resistivity of the state-change material due to irradiation with the control signal shown in FIGS. 1 and 2.

The operation of the photonic device 100 as a modulator is best illustrated with reference to FIGS. 6A-6E in conjunction with FIG. 1. As shown in FIG. 6A, the signal 108 (FIG. 1) is emitted from a light source (not shown) and has an operational frequency $\omega_{op}$ (FIG. 4) for the transmission spectrum of the electromagnetic resonator 110. As previously discussed, the operation frequency $\omega_{op}$ may be at or near a characteristic magnetic or electric-dipole resonance frequency of the electromagnetic resonator 110. In certain embodiments of the present invention, the operational frequency $\omega_{op}$ of the signal 108 may be chosen to be slightly off-resonance with a magnitude $\omega_r \pm \Delta\omega$ to minimize loss. For example, in the case of a split-ring resonator in which the magnetic resonance $\omega_m$ is desired to be excited, the operational frequency $\omega_{op}$ of the signal 108 may be selected so that the imaginary component of the permeability $\mu$ of the electromagnetic resonator 110 is small. As shown in FIG. 6A, the signal 108 exhibits a substantially constant intensity that irradiates the electromagnetic resonator 110 of the resonator structure 102. As shown in FIG. 6B, the control radiation source 104 also outputs the control signal 106 (FIG. 1), which exhibits a time-varying intensity. The control signal 106 irradiates at least the layer 107 of state-change material of the resonator structure 102. As previously described, the control signal 106 causes the layer 107 of state-change material to repeatedly transition between a high-resistivity state and a low-resistivity state that generally corresponds to the pattern of the control signal 106. For example, as shown in FIG. 6C, responsive to the control signal 106 shown in FIG. 6B, the layer 107 of state-change material exhibits a low-resistivity state when the intensity of the control signal 106 is at a relatively high magnitude and a high-resistivity state when the intensity of the control signal 106 is at a relatively low magnitude.

Figure 6D:
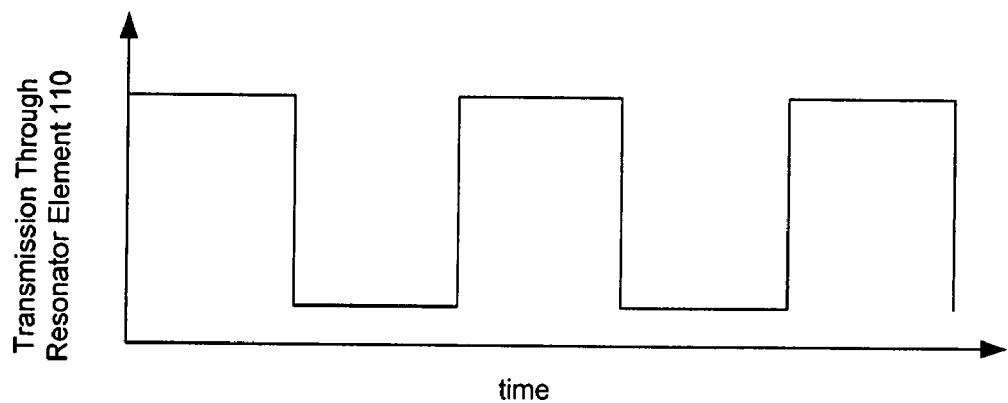
FIG. 6D is a graph of the time-varying transmission through the resonator structure shown in FIGS. 1 and 2.
Figure 6E:
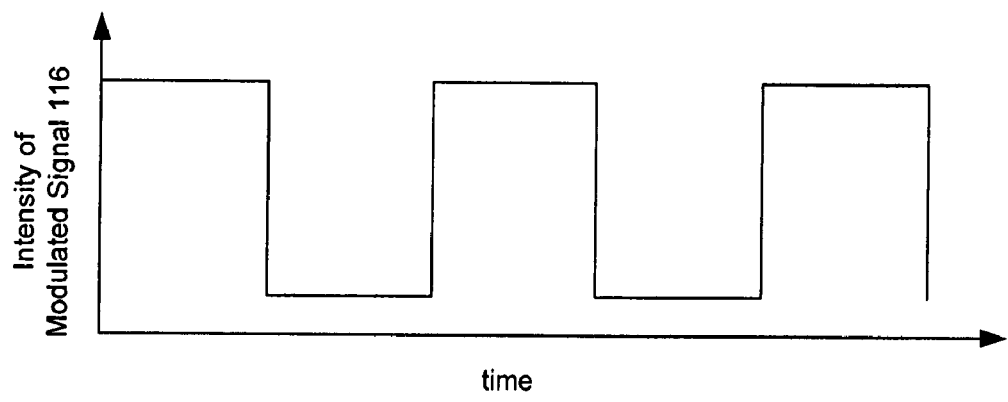
FIG. 6E is a graph of the time-varying intensity of the modulated signal transmitted through the resonator structure shown in FIGS. 1 and 2.

As previously described, due to the resistivity of the state-change material of the layer 107 being modulated between the high-resistivity state and the low-resistivity state, transmission of the signal 108 through the electromagnetic resonator 110, as shown in FIG. 6D, varies temporally. Maximum transmission through the electromagnetic resonator 110 and the entire resonator structure 102 occurs when the state-change material is in the low-resistivity state and minimum transmission occurs when the state-change material is in the high-resistivity state. As shown in FIG. 6E, the intensity of the signal 108 is modulated upon passing through the electromagnetic resonator 110 to produce the modulated signal 116 (FIG. 1) that is transmitted through the resonator structure 102. It should be emphasized that the signal patterns shown in FIGS. 6A-6E are merely for illustrative purposes and that other signal patterns that depart from the square-wave patterns may be used.

Figure 7:
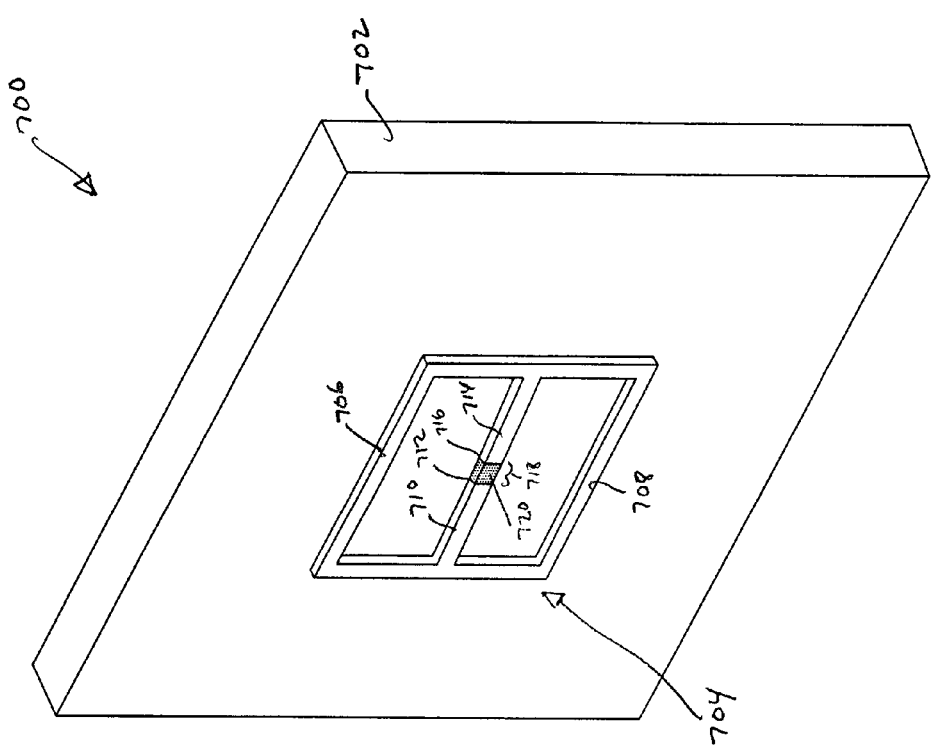
FIG. 7 is a schematic isometric view of a resonator structure according to another embodiment of the present invention.

The configuration of the resonator structure 102 shown in FIGS. 1 and 2 merely represents one embodiment of the present invention. Other configurations for a resonator structure may also be used. For example, FIG. 7 shows a resonator structure 700 according to another embodiment of the present invention. The resonator structure 700 includes a substrate 702 on which an electromagnetic resonator 704 is formed. The electromagnetic resonator 704 includes two split-ring portions 706 and 708 forming electrodes 710 having a first end 712 and electrode 714 having a second end 716. The first end 712 and second end 716 are spaced to define a gap 718. A state-change material 720, formed from the same materials as the layer 107 shown in FIGS. 1 and 2, is positioned within the gap 718 and contacts the first end 712 and the second end 716.

The resonator structure 702 functions very similar to the resonator structure 102. For example, irradiating the state-change material 720 with a control signal causes the state-change material 720 to transition between a high-resistivity state and a low-resistivity state to control the transmission characteristics of the electromagnetic resonator 704, as previously described.

Figure 8:
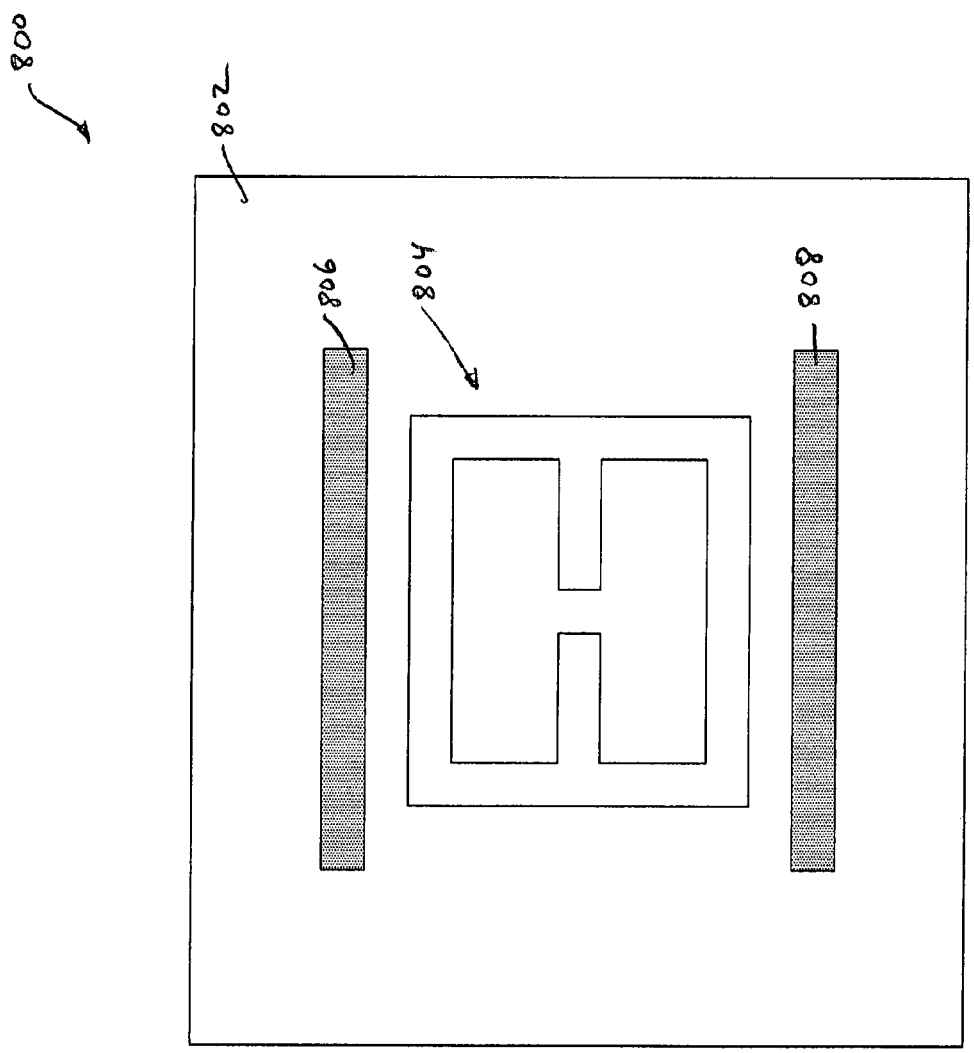
FIG. 8 is a schematic plan view of a resonator structure including a layer of state-change material, an electromagnetic resonator, and resistive heating elements operable to heat the state-change material to control transmission through the electromagnetic resonator according to another embodiment of the present invention.

Instead of using a control signal emitted from a high-intensity radiation source, a state-change material may be transitioned between a high-resistivity state and a low-resistivity state responsive to heating from at least one resistance heating element. FIG. 8 shows a resonator structure 800 according to yet another embodiment of the present invention that may be used in a photonic device. The resonator structure 800 may include a layer 802 of state-change material formed on a substrate (not shown) similar to the resonator structure 102 shown in FIGS. 1 and 2. The resonator structure 800 further includes an electromagnetic resonator 804 that may be configured as any of the previously described electromagnetic resonators. Resistance heating elements 806 and 808 may be provided proximate to the electromagnetic resonator 804 and the layer 802. For example, the resistance heating elements 806 and 808 may be formed within the layer 802.

In operation, the temperature of the resistance heating elements 806 and 808 may be increased by passing a current therethrough that, in-turn, heats the layer 802 of state-change material to effect a state-change from a high-resistivity state to a low-resistivity state, as previously described. When the current through the resistance heating elements 806 and 808 is reduced to a selected level, the temperature of the resistance heating elements 806 and 808 is also reduced so that the layer 802 of state-change material transitions from the low-resistivity state to the high-resistivity state. Thus, the temperature of the layer 802 may be controlled to controllably vary the resistivity state of the layer 802 and generate a time-varying resistivity pattern similar to the graph shown in FIG. 6C. For example, when the state-change material forming the layer 802 is $VO_2$, the resistance heating elements 806 and 808 may effect transition from the high-resistivity state and the low-resistivity state in a nanosecond time scale, such as about 10 ns. Accordingly, the resistance heating elements 806 and 808 may be utilized in a manner similar to the control signal 106 output from the control radiation source shown and described with respect to FIGS. 1 and 2.

Figure 9:
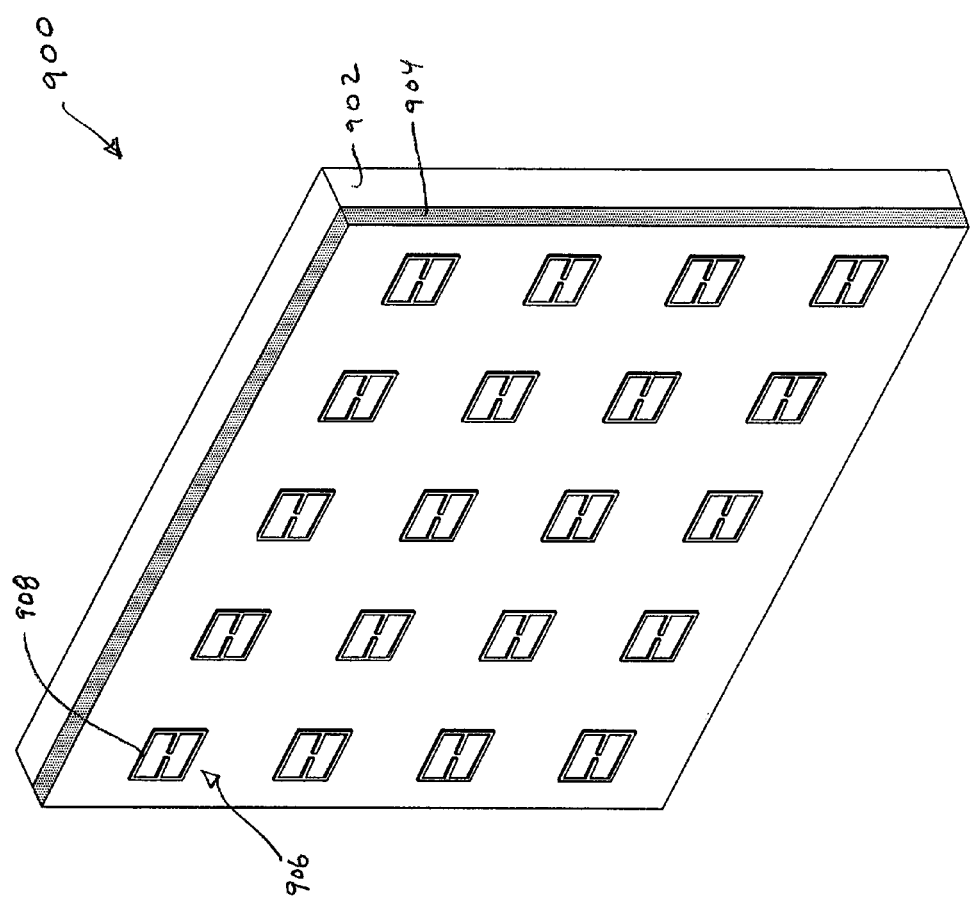
FIG. 9 is a schematic isometric view of a resonator structure including an array of electromagnetic resonators for use in a photonic device according to yet another embodiment of the present invention.

Although the resonator structures described above having only included a single electromagnetic resonator, in other embodiments of the present invention, a resonator structure may include an array of electromagnetic resonators. For example, FIG. 9 shows a resonator structure 900 according to yet another embodiment of the present invention. The resonator structure 900 includes a substrate 902 in which a layer 904 of state-change material is formed. A periodic array 906 of electromagnetic resonators 908 may be formed on the layer 904. The periodic array 906 of electromagnetic resonators 908, is also considered a metamaterial because of it may exhibit negative permeability to magnetic fields, $\mu$, and/or negative permittivity to electric fields, $\in$. In the illustrated embodiment, each of the electromagnetic resonators 908 is shown configured similarly to the electromagnetic resonator 110 shown in FIGS. 1 and 2. However, in other embodiments of the present invention, the electromagnetic resonators 908 may be configured as any of the previously described embodiments of electromagnetic resonators.

The response of the periodic array 906 of electromagnetic resonators 908 to irradiation with electromagnetic radiation is very similar to the resonator structure 102. For example, the resonator structure 900 exhibits a characteristic transmission spectrum very similar to the transmission spectrums 400 and 402 shown in FIGS. 4 and 5, with a resonance frequency $\omega_r$ that is determined by the collective response of the individual electromagnetic resonators 908 to irradiation with electromagnetic radiation. However, it is noted that the resonance frequency $\omega_r$ for the resonator structure 900 may be equal to, lower, or higher than the resonance frequency for one of the electromagnetic resonators 908. Varying the resistivity state of the layer 904 enables controllably varying the transmission of an electromagnetic signal through each of the electromagnetic resonators 908 and the collective periodic array 906. Accordingly, the resonator structure 900 may replace the resonator structure 102 to form a photonic device.

A periodic array of electromagnetic resonators may be used in applications in which, for example, a diameter of a beam of light to be modified by the resonator structure 900 is large relative to the size of a single electromagnetic resonator so that a substantial portion of the beam may not be modified by the single electromagnetic resonator. Thus, an array of electromagnetic resonators may be used to ensure that substantially all or a large portion of the beam is modified.

Figure 10:
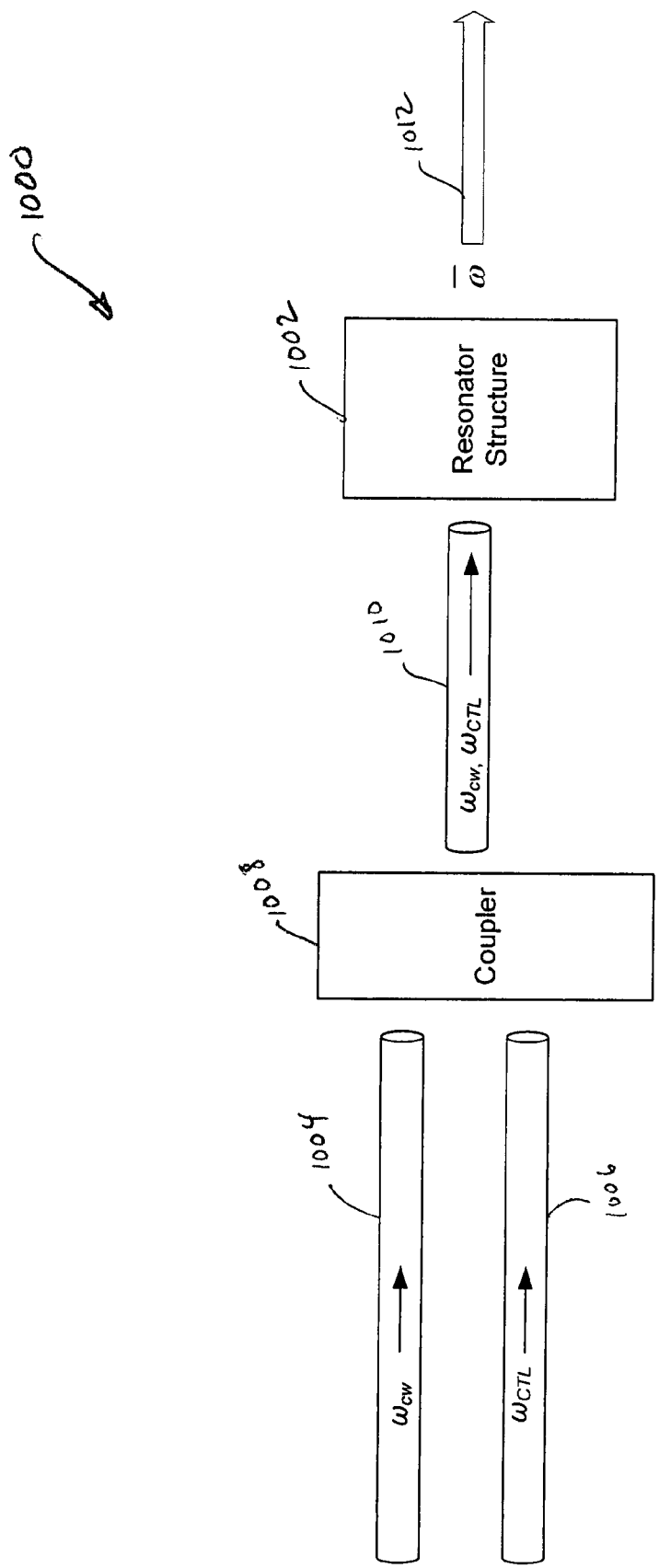
FIG. 10 is a schematic diagram of an optical fiber system that may utilize any of the disclosed resonator structures according to one embodiment of the present invention.

The disclosed embodiments of photonic devices and resonator structures may be used in a number of different applications. FIG. 10 shows an optical fiber system 1000 according to one embodiment of the present invention. The optical fiber system 1000 includes a resonator structure 1002 that may be configured as any of the previously described embodiments of resonator structures. The optical fiber system 1000 further includes an optical fiber 1004 configured for transmitting a carrier signal having a frequency $\omega_{cw}$ output from an electromagnetic radiation source (not shown), such as an LED or a laser diode. The frequency $\omega_{cw}$ may be at or near an operational frequency of an electromagnetic resonator or array of electromagnetic resonators of the resonator structure 1002. The optical fiber system 1000 further includes an optical fiber 1006 configured for transmitting a control signal having frequency $\omega_{CTL}$ output from an electromagnetic radiation source (not shown), such as an LED or a laser diode. The control signal functions to controllably vary a resistivity state of a state-change material, as previously described. A coupler 1008 is provided that is configured to combine the control signal and the carrier signal and transmit the combined signals through an optical fiber 1010. For example, the coupler 1008 may be, a circulator, grating coupler, near-field coupler, or another suitable coupler.

During operation, the carrier signal $\omega_{cw}$ is transmitted through the optical fiber 1004 and the control signal is transmitted through the optical fiber 1006. The signals are combined in the coupler 1008 and further transmitted, together, through the optical fiber 1010 to the resonator structure 1002. The resonator structure 1002 modulates the carrier signal $\omega_{cw}$ to produce a signal 1012 $\overline{\omega}$ having a modulated optical intensity, as previously described. In another embodiment of the present invention, the optical fiber 1004 and coupler 1008 may be omitted, and the resonator structure 1002 may have integrated resistance heating elements to effect modulation of the carrier signal.

Figure 11:
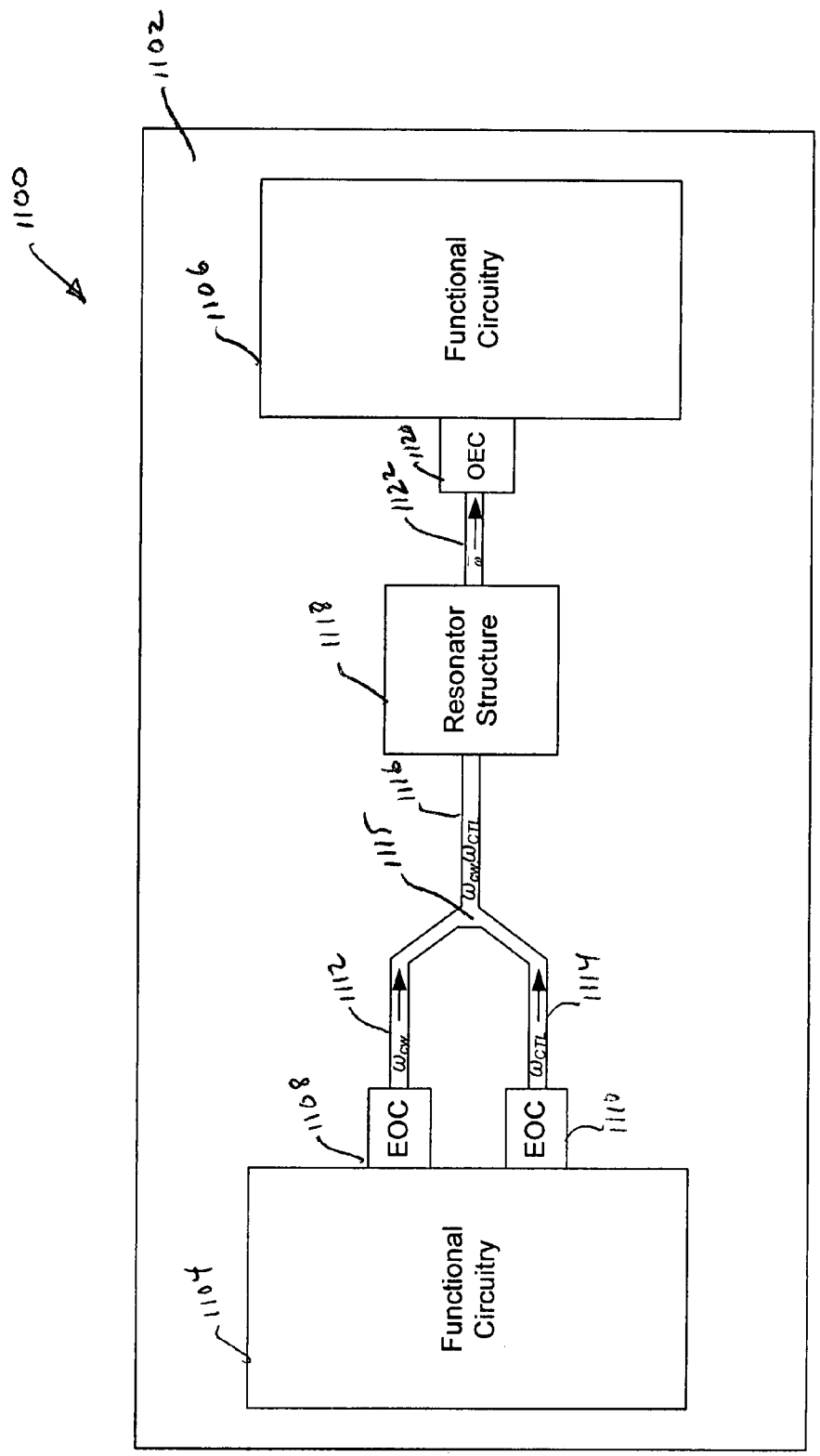
FIG. 11 is a functional block diagram of a PIC that may utilize any of the disclosed resonator structures according to another embodiment of the present invention.

FIG. 11 shows a PIC 1100 according to another embodiment of the present invention. The PIC 1100 may employ any of the disclosed embodiments of photonic devices and resonator structures. The PIC 1100 includes a substrate 1102 that includes functional circuitry 1104 and 1106. For example, the substrate 1102 may be a single-crystal silicon substrate and the functional circuitry 1104 and 1106 may be CMOS circuitry. As merely an example, the functional circuitry 1104 may be configured to perform processing functions and the functional circuitry 1106 may be configured to perform memory functions. A first electrical-to-optical converter ("EOC") 1108, such as an LED or a laser diode, is provided that outputs a carrier signal having a frequency $\omega_{cw}$ responsive to electrical signals from the functional circuitry 1104. A second EOC 1110, such as a laser diode, is also provided that outputs a control signal having a frequency $\omega_{CTL}$ responsive to electrical signals from the functional circuitry 1104.

The carrier signal and control signal propagate through corresponding dielectric waveguides 1112 and 1114 into a Y-junction 1115 and a dielectric waveguide 1116. The dielectric waveguides 1112, 1114, and 1116 may be formed on or in the substrate 1102. The control signal and the carrier signal propagate through the dielectric waveguide 1116 and into a resonator structure 1118 that may be configured as any of the previously described embodiments of resonator structures. The frequency $\omega_{cw}$ of the carrier signal may be at or near an operational frequency of an electromagnetic resonator or array of electromagnetic resonators of the resonator structure 1118. The control signal functions to controllably vary the resistivity state of a state-change material of the resonator structure 1118, as previously described. The resonator structure 1118 modulates the carrier signal $\omega_{cw}$ to produce a signal $\overline{\omega}$ having a modulated optical intensity, as previously described. The signal $\overline{\omega}$ is transmitted to an optical-to-electrical converter ("OEC") 1120, such as a PIN photodiode, via a dielectric waveguide 1122 that may be formed on or in the substrate 1102. The OEC 1120 is operable to convert the signal $\overline{\omega}$ to an encoded electrical signal that is further transmitted to the functional circuitry 1106. In another embodiment of the present invention, the EOC 1108 and the waveguide 1112 may be omitted, and the resonator structure 1118 may have integrated resistance heating elements to effect modulation of the carrier signal.

Although the present invention has been described in terms of particular embodiments, it is not intended that the present invention be limited to these embodiments. Modifications within the spirit of the present invention will be apparent to those skilled in the art. For example, the configuration of the disclosed electromagnetic resonators may be varied from the illustrated embodiments. Additionally, a number of additional two-dimensional arrays of electromagnetic resonators (i.e., split-ring resonators, cut-wires, etc.) may be positioned behind, for example, the resonator structure 900 to form a three-dimensional metamaterial. In such an embodiment, the resonator structure 900 may be used to modulate a carrier signal that is further transmitted, after modulation, through the additional two-dimensional arrays. In yet another embodiment of the present invention, an electromagnetic resonator for use in a resonator structure may be designed to exhibit both a negative effective permittivity and a negative effective permeability at the frequency of interest (i.e., a negative refractive index). In such an embodiment, the transmission spectrum of the electromagnetic resonator exhibits a characteristic pass-band as opposed to the stop-band shown in the transmission spectrum 400. Transitioning the state-change material between resistivity states may be used to allow transmission through the electromagnetic resonator when the state-change material is in a high-resistivity state and substantially block transmission through the electromagnetic resonator when the state-change material is in a low-resistivity state.

Moreover, other stimuli may be used to transition the state-change material from a high-resistivity state to a low-resistivity state besides irradiation with a control signal or heating. For example, the state-change materials of the disclosed resonator structures may be subjected to an applied electric field from a voltage source to transition the state-change material between the high-resistivity state and the low-resistivity state. The disclosed embodiments of resonator structures may also be utilized in other applications besides optical fibers systems and PICs. For example, in another embodiment of the present invention, the disclosed resonator structures may be used in radio frequency applications in which the disclosed resonator structures modify short-range THz frequency signals for wireless communication applications.

The foregoing description, for purposes of explanation, used specific nomenclature to provide a thorough understanding of the present invention. However, it will be apparent to one skilled in the art that the specific details are not required in order to practice the present invention. The foregoing descriptions of specific embodiments of the present invention are presented for purposes of illustration and description. They are not intended to be exhaustive of or to limit the present invention to the precise forms disclosed. Many modifications and variations are possible in view of the above teachings. The embodiments are shown and described in order to best explain the principles of the present invention and its practical applications, to thereby enable others skilled in the art to best utilize the present invention and various embodiments with various modifications as are suited to the particular use contemplated. It is intended that the scope of the present invention be defined by the claims and their equivalents.

The invention claimed is:

1. A photonic device, comprising:
   at least one electromagnetic resonator; and
   a state-change material operably coupled to the at least one electromagnetic resonator, the state-change material capable of being reversibly transitioned between a high-resistivity state and a low-resistivity state, a ratio of the resistivity of the high-resistivity state to the resistivity of the low-resistivity state being at least about 100, transmission of electromagnetic radiation through the at least one electromagnetic resonator at an operational frequency controllable by transitioning the state-change material between the high-resistivity state and the low-resistivity state.

2. The photonic device of claim 1, further comprising:
   a control radiation source operable to emit a control signal that promotes transition of the state-change material from the high-resistivity state to the low-resistivity state.

3. The photonic device of claim 2 wherein the state-change material is formulated to absorb the control signal to increase the temperature of the state-change material past a critical temperature of the state-change material so that the state-change material transitions from a high-resistivity phase to a low-resistivity phase.

4. The photonic device of claim 1, further comprising:
   at least one resistive heating element operable to heat the state-change material to transition the state-change material from the high-resistivity state to the low-resistivity state.

5. The photonic device of claim 1 wherein the state-change material further comprises a metal oxide.

6. The photonic device of claim 5 wherein the metal oxide is selected from the group consisting of an oxide of vanadium, titanium, niobium, and tungsten.

7. The photonic device of claim 5 wherein the metal oxide exhibits a critical temperature, the metal oxide being in the high-resistivity state at a first temperature below the critical temperature and the metal oxide being in the low-resistivity state at a second temperature above the critical temperature.

8. The photonic device of claim 1 wherein the ratio of the resistivity of the high-resistivity state to the resistivity of the low-resistivity state is at least about $10^3$.

9. The photonic device of claim 1 wherein the at least one electromagnetic resonator further comprises:
   at least one split-ring portion including a first end and an opposing second end spaced to define a gap therebetween in which the state-change material is disposed.

10. The photonic device of claim 1 wherein the at least one electromagnetic resonator comprises one of:
    at least one split-ring resonator; and
    a cut-wire structure.

11. The photonic device of claim 1 wherein the at least one electromagnetic resonator further comprises an array of electromagnetic resonators.

12. A photonic integrated circuit including the photonic device of claim 1.

13. A optical fiber system including the photonic device of claim 1.

14. A method of controlling transmission of a signal, the method comprising:
    providing at least one electromagnetic resonator and a state-change material operably coupled to the at least one electromagnetic resonator;
    irradiating the at least one electromagnetic resonator with the signal; and
    transitioning the state-change material between a high-resistivity state and a low-resistivity state to control transmission of the signal through the at least one electromagnetic resonator, a ratio of the resistivity of the high-resistivity state to the resistivity of the low-resistivity state being at least about 100.

15. The method of claim 14 wherein transitioning the state-change material between a high-resistivity state and a low-resistivity state to control transmission of the signal through the at least one electromagnetic resonator further comprises:
    irradiating the state-change material with a control signal selected to promote transition of the state-change material between the high-resistivity state to the low-resistivity.

16. The method of claim 15 wherein irradiating the state-change material with the control signal heats the state-change material past a critical temperature of the state-change material to transition the state-change material from a high-resistivity phase to a low-resistivity phase.

17. The method of claim 14 wherein transitioning the state-change material between a high-resistivity state and a low-resistivity state to control transmission of the signal through the at least one electromagnetic resonator further comprises:
    heating the state-change material past a critical temperature of the state-change material.

18. The method of claim 17 wherein heating the state-change material past a critical temperature of the state-change material further comprises:
    heating the state-change material using at least one resistance heating element in thermal communication with the state-change material.

19. The method of claim 14 wherein transitioning the state-change material between a high-resistivity state and a low-resistivity state to control transmission of the signal through the at least one electromagnetic resonator further comprises:
    repeatedly transitioning the state-change material between the high-resistivity state and the low-resistivity state to modulate the signal transmitted through the at least one electromagnetic resonator.

20. The method of claim 14 wherein the state-change material comprises a metal oxide selected from the group consisting of an oxide of vanadium, titanium, niobium, and tungsten.

* * * * *